(12) United States Patent
Moulin

(10) Patent No.: US 6,798,559 B2
(45) Date of Patent: Sep. 28, 2004

(54) ELECTRO-OPTIC SPATIAL MODULATOR FOR HIGH ENERGY DENSITY

(75) Inventor: Michel Moulin, Apples (CH)

(73) Assignee: Kodak Polychrome Graphics LLC, Norwalk, CT (US)

( * ) Notice: Subject to any disclaimer, the term of this patent is extended or adjusted under 35 U.S.C. 154(b) by 60 days.

(21) Appl. No.: 10/235,329

(22) Filed: Sep. 6, 2002

(65) Prior Publication Data

US 2004/0047025 A1 Mar. 11, 2004

(51) Int. Cl.$^7$ ................................................ G02F 1/01
(52) U.S. Cl. ....................... 359/288; 359/322; 359/315; 359/245
(58) Field of Search ................................ 359/288, 290, 359/291, 245, 254, 315, 322, 321, 204, 259, 244, 237, 389

(56) References Cited

U.S. PATENT DOCUMENTS

| | | | |
|---|---|---|---|
| 3,700,912 A | | 10/1972 | Glass et al. |
| 3,928,822 A | * | 12/1975 | Chenoweth et al. ........ 359/249 |
| 4,281,904 A | * | 8/1981 | Sprague et al. ............. 359/263 |
| 4,415,915 A | | 11/1983 | Sprague et al. |
| 4,554,561 A | * | 11/1985 | Daniele et al. ............. 347/234 |
| 4,746,942 A | * | 5/1988 | Moulin ....................... 396/549 |
| 4,853,528 A | | 8/1989 | Byren et al. |
| 5,252,180 A | * | 10/1993 | Sang et al. ................... 216/18 |
| 5,821,545 A | | 10/1998 | Lindsay et al. |
| 5,949,526 A | * | 9/1999 | Koguchi ....................... 355/47 |
| 6,222,666 B1 | | 4/2001 | Moulin |
| 6,339,660 B1 | | 1/2002 | Buchmann et al. |
| 6,643,049 B2 | * | 11/2003 | Moulin ....................... 359/259 |

FOREIGN PATENT DOCUMENTS

| EP | 0 302 589 A1 | 2/1989 |
|---|---|---|
| JP | 57000617 | 1/1982 |

OTHER PUBLICATIONS

Scibor–Ryslki, M.T.V., "Total–internal–Reflection Electo–Optic Diffraction Deflector/Modulator" *Electronics Letters*, vol. 9, No. 14, Jul. 12, 1973, pp. 309–310.
Zhang Y., et al., "Growth and properties of Zn doped lithium riobate crystal", *Journal of Crystal Growth*, vol. 233, No. 3, Dec. 2001, pp. 537–540.
PCT International Search Report, International Application No. PCT/US03/26540, mailed Dec. 4, 2003 (7 pages).

* cited by examiner

*Primary Examiner*—Ricky Mack
*Assistant Examiner*—Brandi N Thomas
(74) *Attorney, Agent, or Firm*—Faegre & Benson LLP

(57) ABSTRACT

The present invention provides an imaging assembly comprising: (a) a modulator crystal comprising a first surface and a second surface substantially opposite to the first surface, wherein the first surface comprises an active area; and (b) a heating element for heating the modulator crystal to a temperature within a predetermined temperature range, wherein the heating element is positioned under the modulator crystal and comprises a first surface, wherein the heating element first surface faces the modulator crystal second surface and covers a portion of the modulator crystal second surface such that the active area of the first surface of the modulator crystal has a homogeneous temperature. The present invention also provides a method for heating a modulator crystal in an imaging assembly, the method comprising: (a) providing a modulator crystal comprising a first surface and a second surface substantially opposite to the first surface, wherein the first surface comprises an active area; (b) providing a heating element comprising a first surface, wherein the heating element first surface faces the modulator crystal second surface and covers a portion of the modulator crystal second surface such that the active area of the first surface of the modulator crystal has a homogeneous temperature; (c) heating the modulator crystal with the heating element to a temperature within a predetermined temperature range; and (d) maintaining the temperature of the modulator crystal within the predetermined temperature range.

30 Claims, 7 Drawing Sheets

ELECTRO-OPTIC SPATIAL MODULATOR FOR HIGH ENERGY DENSITY

BACKGROUND OF THE INVENTION

1. Field of the Invention

The present invention relates to a method and apparatus for improving the performance of a modulator crystal in an imaging assembly. In particular, the invention relates to a method and apparatus for heating a modulator crystal in an imaging assembly without substantially modifying the temperature of the electronic components of the imaging assembly.

2. Background Information

Some of the current trends in the thermal offset printing plate industry have been in the area of increased productivity, especially as they relate to so-called "Computer to Plate" (CTP) systems. However, such conventional systems are presently limited, especially as they relate to imaging of thermal offset plates. Conventional internal drum systems are limited, for example, with respect to the spinning speed of the mirror, the commutation time on/off of the laser beam (for acousto-optic modulators with YAG lasers, red and UV laser diodes and optical fiber lasers), and power of the laser sources. Conventional external drum systems which have a plurality of laser sources such as diodes are limited, for example, with respect to respective rotational speeds, respective number of diodes and the total power generated thereby. Conventional external drums employing a spatial modulator also have power limitations as well as limitations with respect to the number of spots produced thereby. Conventional flat bed systems have "width of plate" limitations, resolution limitations, as well as limited scanning speeds, modulation frequencies and power of the respective laser source.

A conventional system in which a laser beam is widened in one dimension to cover an array of a substantial number of electro-optic gates (so that a large number of adjacent spots can be formed and thus constitute a "wide brush") is described in U.S. Pat. No. 4,746,942, which is incorporated herein by reference. In particular, this patent discloses that the beam is divided by the gates into a plurality of potential spot-forming beams. The transmission of each beam to a photosensitive surface for imaging is selectively inhibited in accordance with a pre-determined pattern or program, while the beams are swept relative to the photosensitive surface to form characters and other images.

However, the number of spots of the brush described in this patent may be limited by optical aberrations. In addition, the power that a single laser source can produce limits the imaging speed of thermo-sensitive plates because of their low sensitivity. The performance of a spatial modulator with a single laser source can also be limited.

Laser modulators dedicated to the exposure of thermal media require a laser power of tens of watts or more. In contrast, Total Internal Reflection (TIR) modulators are especially well suited for the exposure of heat sensitive plates, as described, for example, in Electronic Letters, Vol. 9 (1973), p. 309. TIR modulators based on the use of $LiNbO_3$ crystals are of particular interest because of their commutation speed. This type of modulator is described in the literature and several patents such as in U.S. Pat. No. 4,281,904, which is incorporated herein by reference. The operation of TIR modulators in laser printers has been described in U.S. Pat. No. 4,554,561, which is incorporated herein by reference. TIR modulators are presently used in platesetters for the production of heat-sensitive printing plates where a high level of energy is necessary, and the implementation of TIR modulators in platesetters has been described in U.S. patent application Ser. No. 09/865,345 [KPG 1117], filed May 25, 2001, which is incorporated herein by reference.

Since a TIR modulator does not absorb energy, rays of high-power laser may penetrate the modulator without producing heat. However, the penetration of electro-optic modulators by high-energy rays has a negative effect, as described in SPIE Electro-Optic and Magneto-Optic Materials, Vol. 1274 (1990), especially in TIR modulators such as those described in U.S. Pat. No. 4,281,904. When the crystal is submitted to high-energy radiation, the strong energy density induces detrimental photorefraction effects known as "optical damage" and "dc drift." The presence of these side effects in systems where a high level of energy is necessary limits the amount of energy to which a modulator can be subjected, such as exposure of so-called thermal plates.

The present invention addresses the presence of optical damage and DC drift in a modulator. Both problems are solved by raising the operating temperature of the modulator and maintaining the temperature within a predetermined range. The invention also provides a method and apparatus associated for stabilizing the performance of a modulator crystal by automatically controlling the operating temperature of the crystal. The invention also provides a method and apparatus for protecting electronic components associated with a modulator crystal from the detrimental effects of the high temperature of the crystal. Other objects, features and advantages of the present invention will be apparent from the detailed description provided herein.

SUMMARY OF THE INVENTION

Accordingly, it is an object of the present invention to provide an imaging assembly comprising: (a) a modulator crystal comprising a first surface and a second surface substantially opposite to the first surface, wherein the first surface comprises an active area; and (b) a heating element for heating the modulator crystal to a temperature within a predetermined temperature range, wherein the heating element is positioned under the modulator crystal and comprises a first surface, wherein the heating element first surface faces the modulator crystal second surface and covers a portion of the modulator crystal second surface such that the active area of the first surface of the modulator crystal has a homogeneous temperature.

It is another object of the present invention to provide a method for heating a modulator crystal in an imaging assembly, the method comprising: (a) providing a modulator crystal comprising a first surface and a second surface substantially opposite to the first surface, wherein the first surface comprises an active area; (b) providing a heating element comprising a first surface, wherein the heating element first surface faces the modulator crystal second surface and covers a portion of the modulator crystal second surface such that the active area of the first surface of the modulator crystal has a homogeneous temperature; (c) heating the modulator crystal with the heating element to a temperature within a predetermined temperature range; and (d) maintaining the temperature of the modulator crystal within the predetermined temperature range.

It is another object of the present invention to provide an imaging assembly comprising: (a) a modulator crystal comprising a first surface and a second surface substantially opposite to the first surface, wherein the first surface comprises an active area; (b) a heating element for heating the modulator crystal to a temperature within a predetermined temperature range, wherein the heating element is positioned under the modulator crystal and comprises a surface, wherein the heating element surface faces the modulator crystal second surface and covers a portion of the modulator crystal second surface such that the active area of the first surface of the modulator crystal has a homogeneous temperature; and (c) one or more electronic components residing above the first surface of the modulator crystal, wherein the electronic components are thermally insulated from the modulator crystal and from the heating element.

It is another object of the present invention to provide a method for heating a modulator crystal in an imaging assembly, the method comprising: (a) providing a modulator crystal comprising a first surface and a second surface substantially opposite to the first surface, wherein the first surface comprises an active area; (b) positioning under the modulator crystal a heating element comprising a first surface, wherein the heating element first surface faces the modulator crystal second surface and covers a portion of the modulator crystal second surface such that the active area of the first surface of the modulator crystal has a homogeneous temperature; (c) providing one or more electronic components residing above the first surface of the modulator crystal, wherein the electronic components are thermally insulated from the modulator crystal and from the heating element; (d) heating the modulator crystal with the heating element to a temperature within a predetermined temperature range; and (e) maintaining the temperature of the modulator crystal within the predetermined temperature range.

It is another object of the present invention to provide an imaging assembly comprising: (a) a modulator crystal comprising a first surface and a second surface substantially opposite to the first surface, wherein the first surface comprises an active area; (b) a heating element for heating the modulator crystal to a temperature within a predetermined temperature range, wherein the heating element contacts and covers a portion of the modulator crystal second surface such that the active area of the first surface of the modulator crystal has a homogeneous temperature; and (c) one or more electronic components positioned under the first surface of the modulator crystal, wherein the electronic components are thermally insulated from the modulator crystal and from the heating element.

It is another object of the present invention to provide a method for heating a modulator crystal in an imaging assembly, the method comprising: (a) providing a modulator crystal comprising a first surface and a second surface substantially opposite to the first surface, wherein the first surface comprises an active area; (b) contacting and covering with a heating element a portion of the modulator crystal second surface such that the active area of the first surface has a homogeneous temperature; (c) providing one or more electronic components positioned under the first surface of the modulator crystal, wherein the electronic components are thermally insulated from the modulator crystal and from the heating element; (d) heating the modulator crystal with the heating element to a temperature within a predetermined temperature range; and (e) maintaining the temperature of the modulator crystal within the predetermined temperature range.

The present invention ensures that the crystal of the TIR modulator is heated to an optimal temperature while at the same time other components of the imaging assembly are thermally insulated. These components include electronic components associated with the modulator crystal. The temperature of these electronic components is maintained within the temperature range defined by operating specifications of the electronic components. The temperature within the modulator crystal is maintained homogeneous, thereby avoiding undesirable variations of the index of refraction within the crystal due to temperature variations within the crystal.

DETAILED DESCRIPTION OF THE INVENTION

The imaging assembly of the invention preferably comprises a modulator crystal, a heating element for heating the modulator crystal to a temperature within a predetermined range, and one or more electronic components, wherein the electronic components are thermally insulated from the modulator crystal and from the heating element. Thermal insulation is preferably achieved by positioning one or more thermally insulating elements between the electronic components and the modulator crystal. Thermal insulation is preferably such that heating the modulator crystal with the heating element to a temperature within a predetermined temperature range does not substantially modify the temperature of the electronic components.

The modulator crystal which may be employed in this invention is any modulator crystal capable of operating as a TIR modulator, as described, for example, in U.S. Pat. Nos. 4,281,904 and 4,554,561 and in U.S. patent application Ser. No. 09/865,345. Preferably, the modulator crystal is a crystal comprising $LiNbO_3$. A particularly preferred crystal composition is $LiNbO_3$ with about 5 mol % of MgO or about 7 mol % of Zn. Preferably, the electro-optic quality of the modulator crystal is time-independent.

Preferably, the heating element is a substantially flat heating sheet. Alternatively, the heating element is a resistive coating. The resistive coating is preferably a nickel-chromium coating.

The heating element of the imaging assembly is connected to means for providing power from a power source to the heating element. The power source may comprise a temperature control means for maintaining the power within a range corresponding to the modulator crystal predetermined temperature range.

Other aspects of this invention and its various embodiments will become apparent from the following detailed description and specific references to the accompanying figures.

Figure 1:
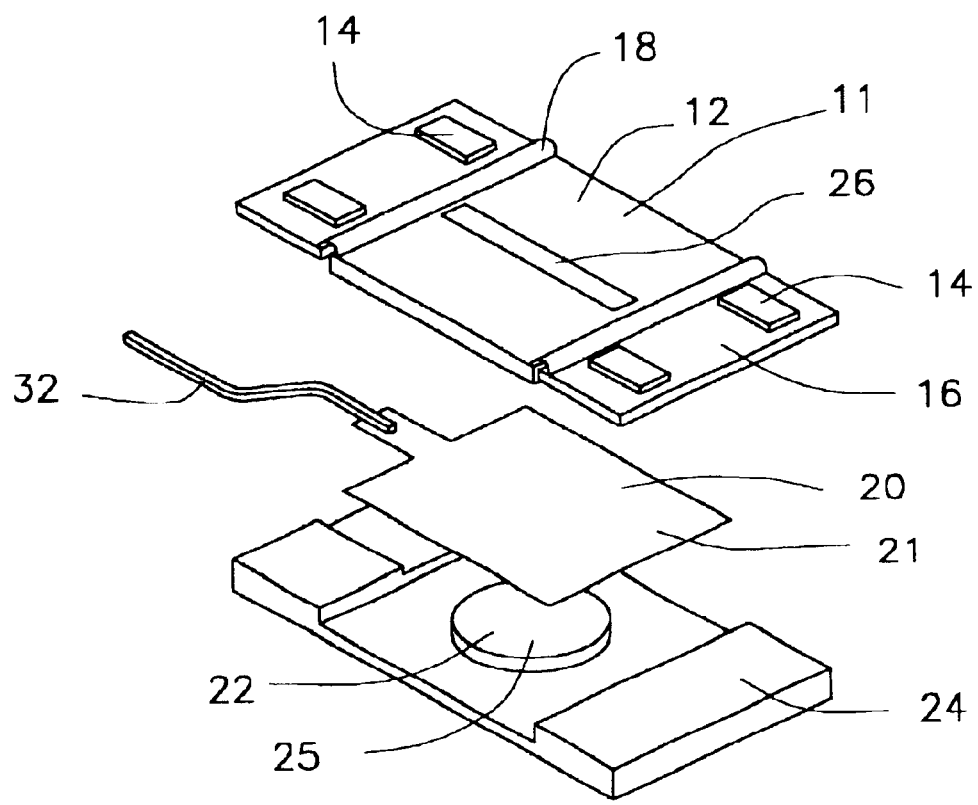
FIG. 1 represents an exploded view of a first embodiment of the assembly of the invention.
Figure 2A:
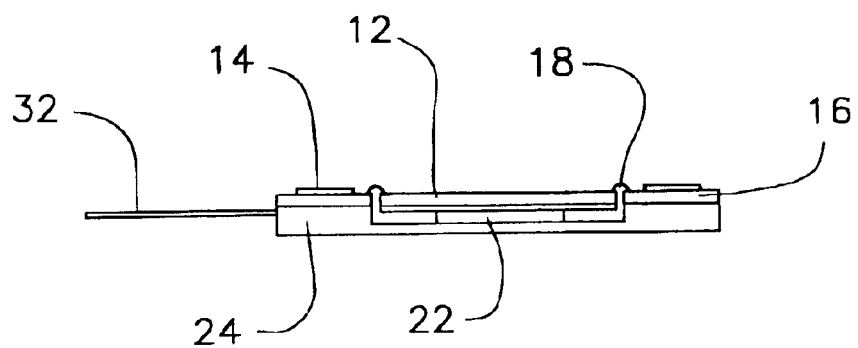
FIG. 2A represents a side view of the embodiment of the assembly of FIG. 1.
Figure 2B:
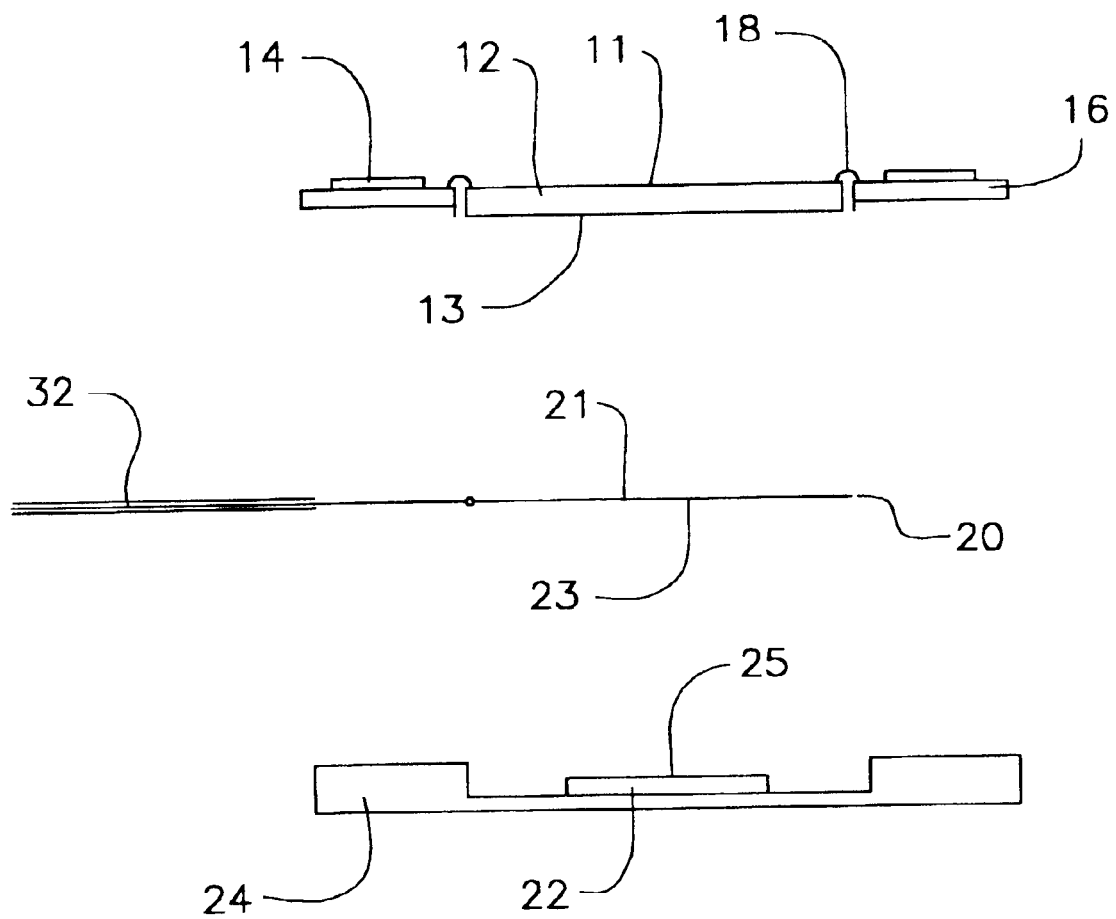
FIG. 2B represents an exploded side view of the embodiment of the assembly of FIG. 1.

Reference is now made to FIGS. 1, 2A and 2B, which illustrate a first embodiment of the imaging assembly of the present invention. As shown in FIG. 1, electronic components 14, which may be electronic drivers or chips as are well known to those skilled in the art for use in imaging assemblies, are electrically connected to board wires 16. Each board wire 16 is connected with wire bonding 18 to a modulator crystal 12. The crystal 12 comprises a first surface 11 comprising active area 26. The term 'active area' as used herein is intended to denote the area or zone onto which the laser beam impinges when the imaging assembly is in operation.

The crystal operates as a TIR modulator, as described, for example, in U.S. patent application Ser. No. 09/865,345. A heating element 20, which can be a substantially flat heating sheet, is positioned under the crystal 12 and comprises a first surface 21 which faces a second surface 13 of the crystal 12 located substantially opposite the surface 11 of the crystal 12, as shown in FIG. 2B. The first surface 21 of heating element 20 covers a portion of the second surface 13 of the crystal 12 such that the active area 26 of the first surface has a homogeneous temperature. Preferably, the first surface 21 of heating element 20 substantially covers the second surface 13 of the crystal 12. The first surface 21 may be attached to a thermally conductive adhesive element, such as an adhesive ribbon (not shown in FIG. 1) which may be attached to the second surface 13 of the crystal 12. Wiring 32 is electrically connected to a power source (not shown in FIG. 1) which supplies the power needed to heat the heating element 20. The imaging assembly may further comprise a support 24 which comprises a thermally insulating component 22 shown in the form of a disc in FIGS. 1, 2A and 2B (which is an exploded cross-sectional view of the embodiment depicted in FIG. 2A). Thermally insulating component 22 is preferably made of glass or porcelain and comprises a first surface 25 which contacts a second surface 23 of the heating element 20 located substantially opposite to first surface 21 of the heating element, as shown in FIG. 2B. The modulator crystal 12, the heating element 20, and the support 24 thereby form a sandwich structure, as can be seen from the side view shown in FIGS. 2A and 2B of the same embodiment of the invention.

Figure 3A:
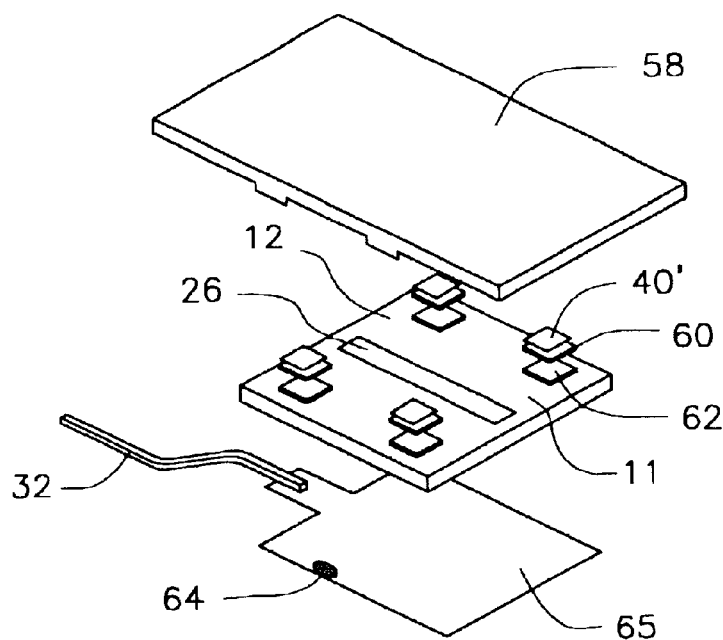
FIG. 3A represents an exploded view of a second embodiment of the assembly of the invention.
Figure 3B:
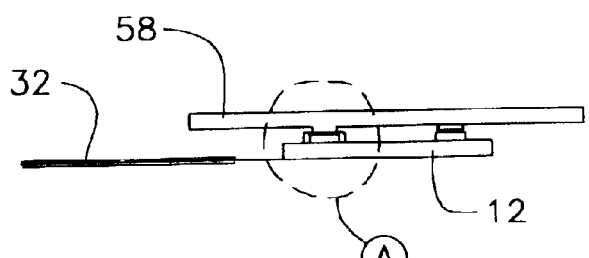
FIG. 3B represents a side view of the embodiment of the assembly of FIG. 3A.
Figure 3C:
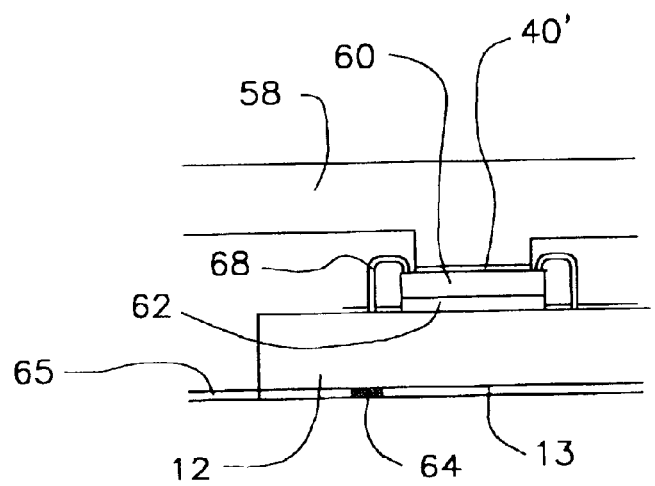
FIG. 3C represents an expanded view of a portion of the side view of FIG. 3B.

Reference is now made to FIGS. 3A–3C, which illustrate a second embodiment of the imaging assembly of the present invention. As shown in exploded view in FIG. 3A, thermally insulating components 62 reside upon the first surface 11 of modulator crystal. Electronic components 60 in turn reside upon thermally insulating components 62, which thermally insulate electronic components from modulator crystal 12 and from heating element 64. Surface 11 comprises active area 26 onto which the laser beam impinges when the imaging assembly is in operation. The imaging assembly may also include a cooling support 58 which is thermally connected to the electronic components 60. Preferably, the cooling support 58 is made of aluminum. Thermal connection of the cooling support 58 to the electronic components 60 is achieved by adhesively joining the cooling support 58 to one or more thermally conductive elements 40'. The one or more thermally conductive elements 40', which may be, for example, an adhesive ribbon, also contact the one or more electronic components 60, as shown in FIG. 3B. The adhesive ribbon is preferably made from an adhesive material available from 3M™. The imaging assembly further includes heating element 64, which is positioned under crystal 12. Heating element 64 comprises a first surface 65 which faces and covers a portion of the second surface 13 of the crystal 12 such that the active area 26 of the first surface has a homogeneous temperature. Preferably, first surface 65 faces and substantially covers second surface 13 of the crystal 12. The surface 65 may be attached to a thermally conductive adhesive element, such as an adhesive ribbon (not shown in FIGS. 3A–3C) which may be attached to second surface 13 of the crystal 12. Wiring 32 is connected to a power source (not shown) which supplies the power needed to heat the heating element. The power is minimized to avoid thermal shocks which would affect the performance of the electronic components. Due to the low thermal inertia of the crystal, a low power supply is sufficient to enable the crystal to reach a temperature in the desired range in a relatively short period of time. The preferred temperature range is between about 80° C. and about 120° C. for $LiNbO_3$ crystals. FIG. 3C is an expanded view of portion "A" of FIG. 3B. As shown in FIG. 3C, wire bonding 68 may be used to adhesively bind electronic components 60, thermally insulating components 62 and the modulator crystal 12.

Figure 4A:
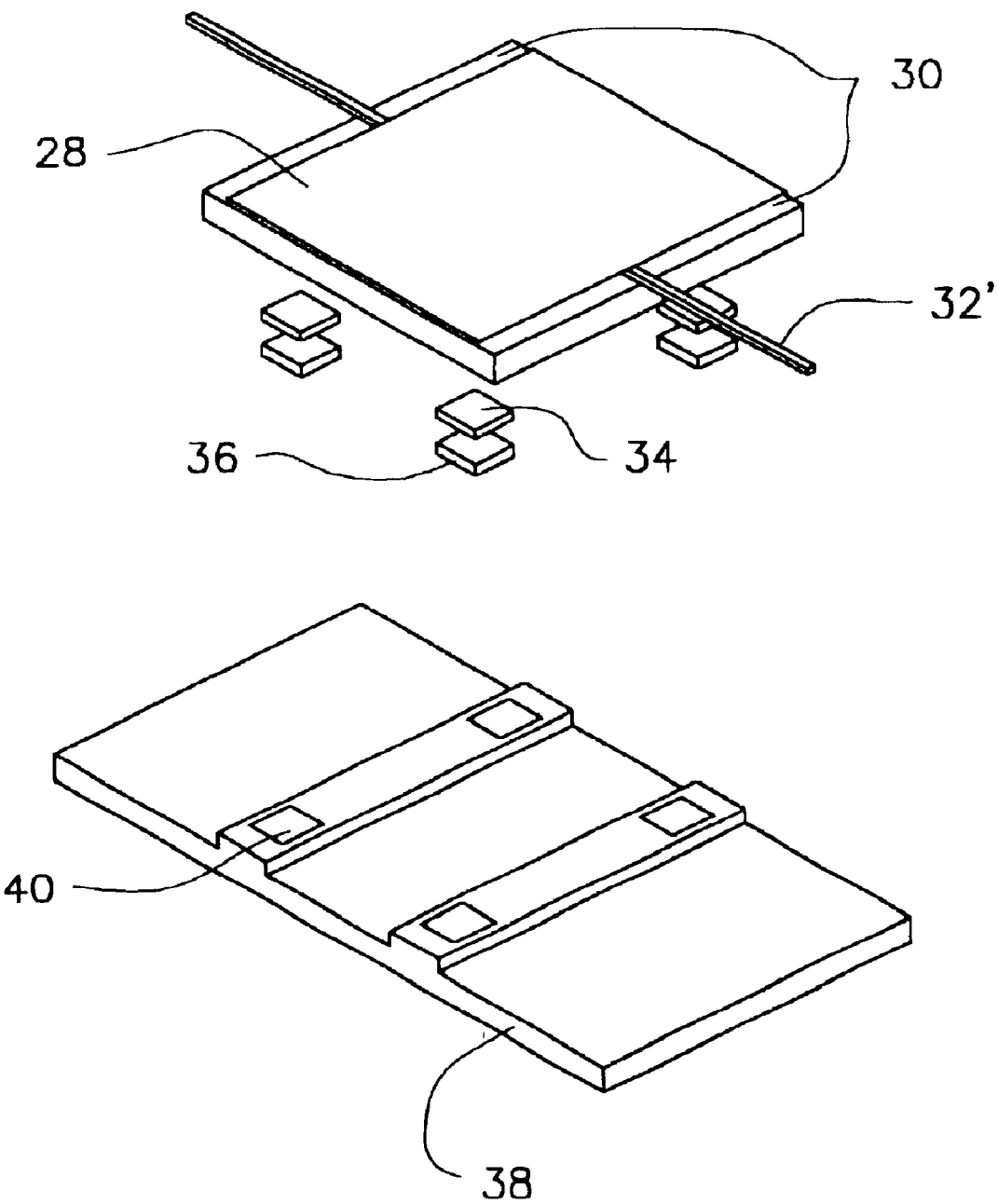
FIG. 4A represents an exploded view of a third embodiment of the assembly of the invention.
Figure 4B:
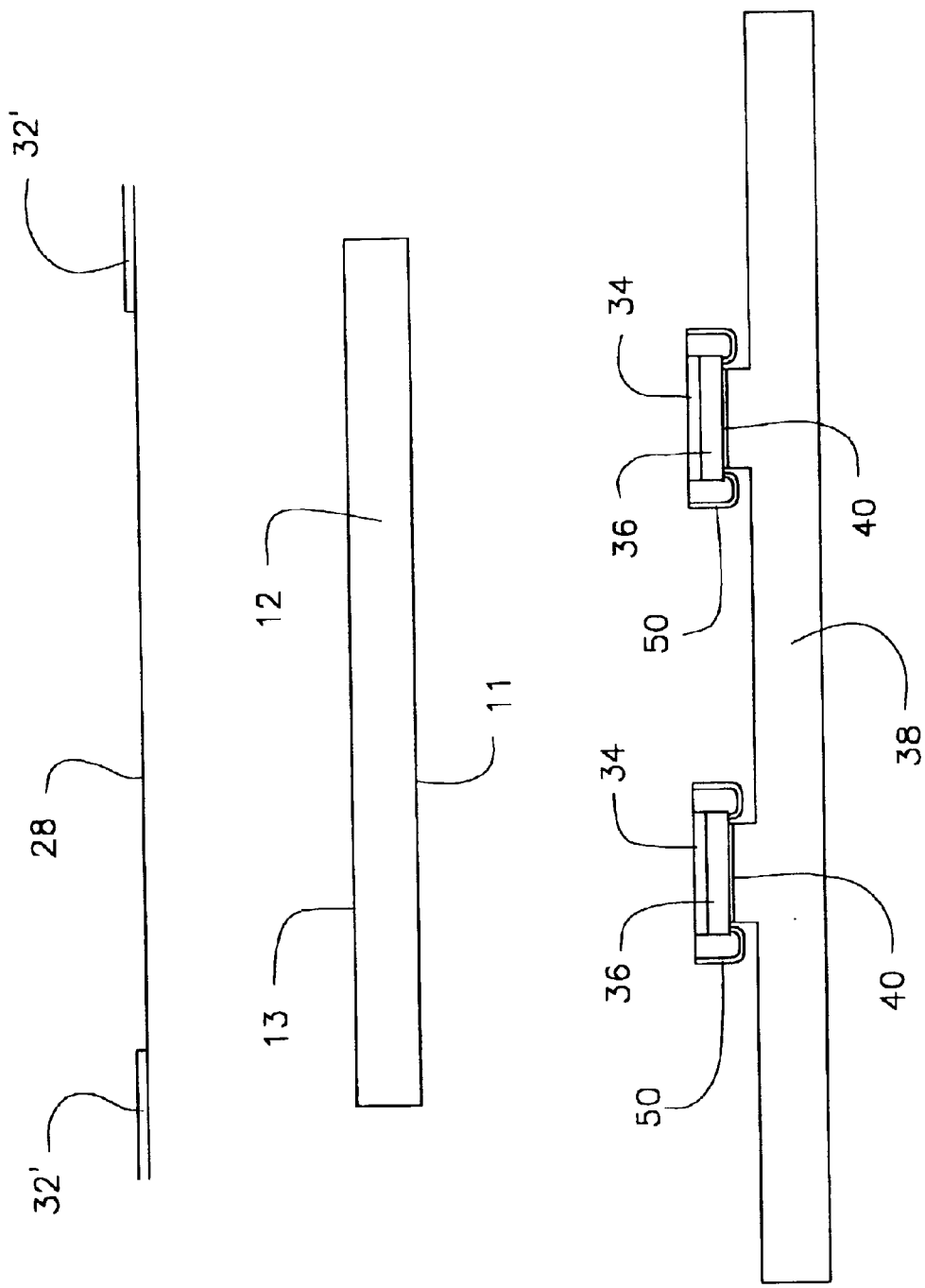
FIG. 4B represents an exploded side view of the view of FIG. 4A.
Figure 4D:
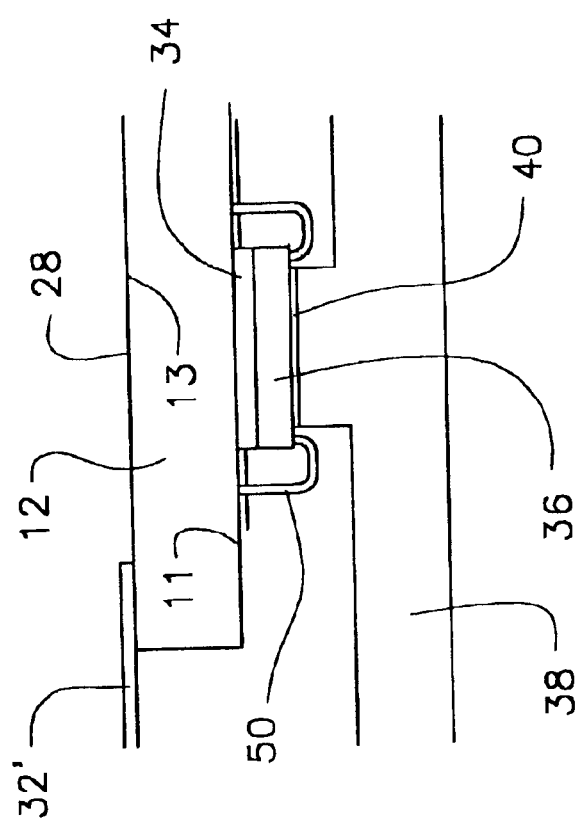
FIG. 4D represents an expanded view of a portion of the side view of FIG. 4C.
Figure 4C:
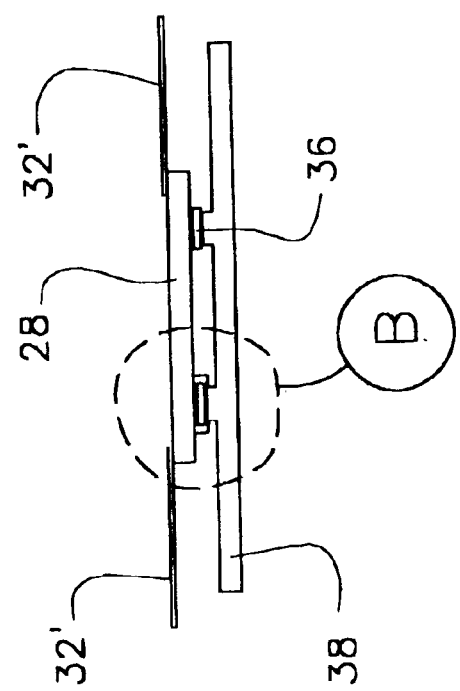
FIG. 4C represents a side view of the embodiment of the assembly of FIG. 4A.

Reference is now made to FIG. 4A, which represent a third embodiment of the imaging assembly of the invention. As shown in exploded view in FIG. 4A, the heating element is a resistive nickel-chromium coating 28 which is deposited under vacuum onto second surface 13 (not visible in FIG. 4A) of the crystal 12, using techniques well known to those skilled in the art and widely used in the semi-conductor industry. Surface 13 is shown in FIG. 4B, which represents an exploded side view of the embodiment of FIG. 4A. As shown in FIG. 4A, the power required to heat coating 28 is supplied by wiring 32' which contacts a first edge of each contact strip 30 made of a thermally conductive material. Preferably, the thermally conductive material is gold. A second edge of each strip 30 opposite to the first edge contacts the coating 28. As shown in FIG. 4B, crystal 12 comprises a first surface 11. Surface 11 contacts each of one or more thermally insulating elements 34. FIG. 4C represents a side view of the embodiment of FIG. 4A, and FIG. 4D represents an expanded side view of portion "B" of FIG. 4C. As shown in FIGS. 4C and 4D, the one or more thermally insulating elements 34 contact one or more electronic components 36. The electronic components 36 in turn contact one or more thermally conductive elements 40. The one or more thermally conductive elements 40 may be, for example, a patch of thermally conductive glue, such as $H_2O$, available from Polyscience A.G. The one or more thermally conductive elements 40 reside on a cooling support 38. As shown in FIGS. 4C and 4D, wire bonding 50 may be used to adhesively bind together electronic components 36, thermally insulating components 34 and the modulator crystal 12.

Figure 5:
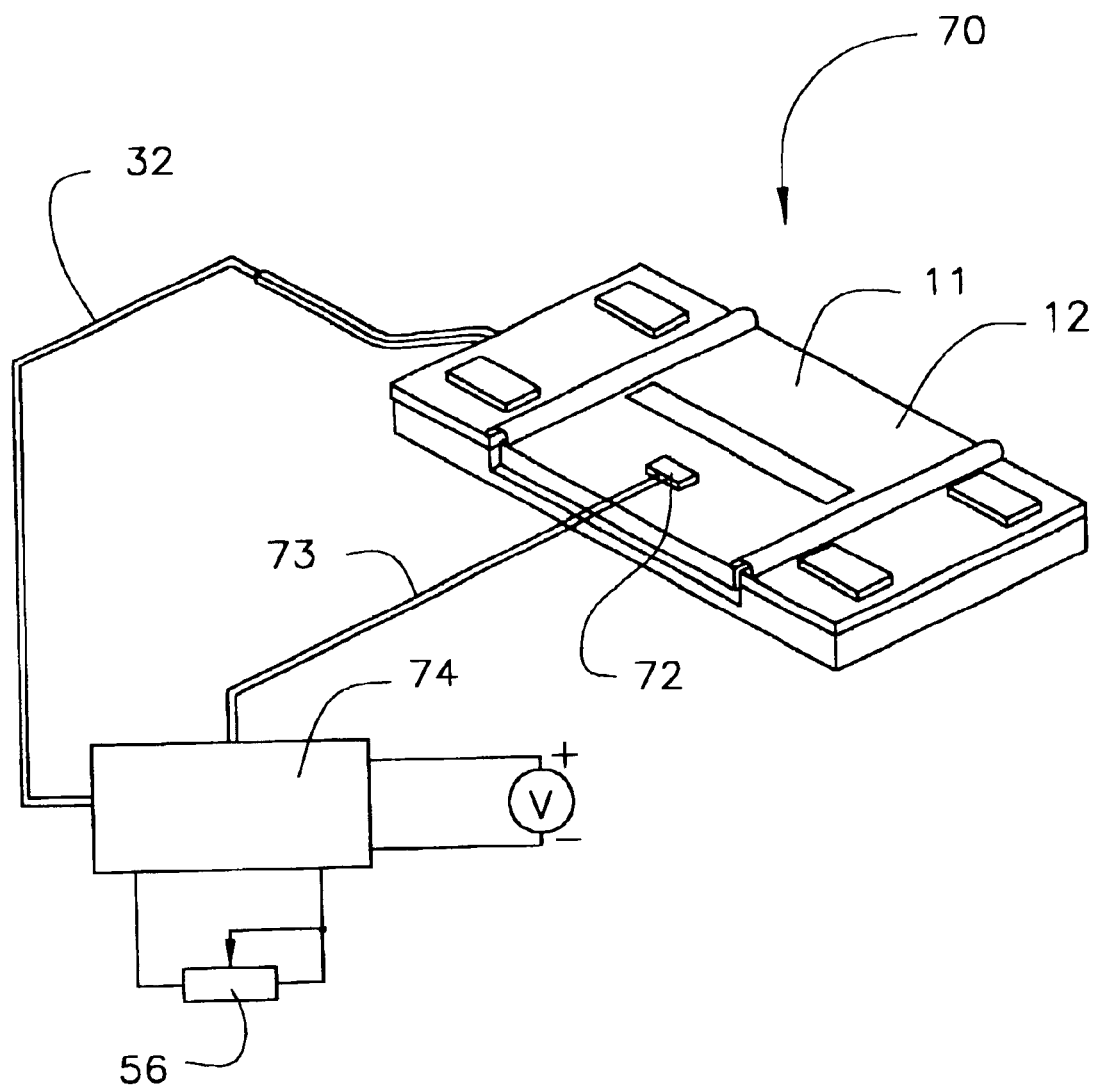
FIG. 5 represents a temperature control circuit in the modulator assembly.

The crystal is preferably first heated to a predetermined temperature and then maintained within a predetermined temperature during operation. Preferably, temperature control for any one of the embodiments shown in FIGS. 2–4 is achieved as shown in FIG. 5. An imaging assembly 70 according to any one of the embodiments previously discussed comprises a modulator crystal 12 having a first surface 11. A sensor 72 contacts the first surface 11 of the modulator crystal and thereby measures the temperature of the modulator crystal. Wiring 73 connects sensor 72 to a power source, such as temperature control circuit 74, which compares the temperature measured by sensor 72 with the desired value. Wiring 32 connects temperature control circuit 74 to the heating element (not shown in FIG. 5). Temperature control circuit 74 includes adjusting circuit 56. Adjusting circuit 56 maintains the power provided from temperature control circuit 74 to wiring 32 within a range corresponding to the modulator crystal predetermined temperature range, thereby maintaining the modulator crystal temperature within the predetermined temperature range.

It should be understood that various changes and modifications to the preferred embodiments described herein will be apparent to those skilled in the art. Such changes and modifications can be made without departing from the spirit and scope of this invention and without diminishing its attendant advantages. It is therefore intended that such changes and modifications be covered by the appended claims.

I claim:

1. An imaging assembly comprising:
   (a) a modulator crystal comprising a first surface and a second surface substantially opposite to the first surface, wherein the first surface comprises an active area; and
   (b) a heating element for heating the modulator crystal to a temperature within a predetermined temperature range, wherein the heating element is positioned under the modulator crystal and comprises a first surface, wherein the heating element first surface faces the modulator crystal second surface and covers a portion of the modulator crystal second surface such that the active area of the first surface of the modulator crystal has a homogeneous temperature.

2. The imaging assembly of claim 1, further comprising one or more electronic components electrically connected to the modulator crystal.

3. The imaging assembly of claim 1, wherein the modulator crystal is a crystal comprising $LiNbO_3$.

4. The imaging assembly of claim 3, wherein the modulator crystal comprising $LiNbO_3$ comprises about 5 mol % of magnesium oxide.

5. The imaging assembly of claim 3, wherein the modulator crystal comprising $LiNbO_3$ comprises about 7 mol % of zinc.

6. The imaging assembly of claim 1, wherein the first surface of the heating element is attached to a thermally conductive adhesive element which is attached to the surface of the modulator crystal.

7. The imaging assembly of claim 1, wherein the heating element is a flat sheet.

8. The imaging assembly of claim 1, further comprising providing a support which comprises a thermally insulating component, wherein the thermally insulating component comprises a surface and the heating element comprises a second surface substantially opposite to the first surface of the heating element, and the surface of the thermally insulating component contacts the second surface of the heating element.

9. The imaging assembly of claim 8, wherein the thermally insulating component is in the form of a disc.

10. The imaging assembly of claim 8, wherein the thermally insulating component is made of glass or porcelain.

11. The imaging assembly of claim 1, wherein the first surface of the heating element is attached to a thermally conductive adhesive element which is attached to the surface of the modulator crystal.

12. The imaging assembly of claim 1, wherein the heating element is connected to means for providing power from a power source to the heating element, and the power source comprises a temperature control means for maintaining the modulator crystal temperature within the predetermined temperature range.

13. The imaging assembly of claim 1, wherein the heating element first surface substantially covers the modulator crystal second surface.

14. A method for heating a modulator crystal in an imaging assembly, the method comprising:
   (a) providing a modulator crystal comprising a first surface and a second surface substantially opposite to the first surface, wherein the first surface comprises an active area;
   (b) providing a heating element comprising a first surface, wherein the heating element first surface faces the modulator crystal second surface and covers a portion of the modulator crystal second surface such that the active area of the first surface of the modulator crystal has a homogeneous temperature;
   (c) heating the modulator crystal with the heating element to a temperature within a predetermined temperature range; and
   (d) maintaining the temperature of the modulator crystal within the predetermined temperature range.

15. An imaging assembly comprising:
   (a) a modulator crystal comprising a first surface and a second surface substantially opposite to the first surface, wherein the first surface comprises an active area;
   (b) a heating element for heating the modulator crystal to a temperature within a predetermined temperature range, wherein the heating element is positioned under the modulator crystal and comprises a surface, wherein the heating element surface faces the modulator crystal second surface and covers a portion of the modulator crystal second surface such that the active area of the first surface of the modulator crystal has a homogeneous temperature; and
   (c) one or more electronic components residing above the first surface of the modulator crystal, wherein the electronic components are thermally insulated from the modulator crystal and from the heating element.

16. The imaging assembly of claim 15, wherein the one or more electronic components are thermally insulated from the modulator crystal and from the heating element by one or more thermally insulating elements contacting the one or more electronic components and contacting the second surface of the modulator crystal.

17. The imaging assembly of claim 15, further comprising a cooling support residing above the one or more electronic components and thermally connected to the one or more electronic components.

18. The imaging assembly of claim 17, wherein the cooling support is thermally connected to the one or more electronic components by one or more thermally conductive elements contacting the cooling support and contacting the one or more electronic components.

19. The imaging assembly of claim 15, wherein the surface of the heating element is attached to a thermally conductive adhesive element which is attached to the first surface of the modulator crystal.

20. The imaging assembly of claim 15, wherein the heating element is connected to means for providing power from a power source to the heating element, and the power source comprises a temperature control means for maintaining the modulator crystal temperature within the predetermined temperature range.

21. The imaging assembly of claim 15, wherein the heating element first surface substantially covers the modulator crystal second surface.

22. A method for heating a modulator crystal in an imaging assembly, the method comprising:
   (a) providing a modulator crystal comprising a first surface and a second surface substantially opposite to the first surface, wherein the first surface comprises an active area;
   (b) positioning under the modulator crystal a heating element comprising a first surface, wherein the heating element first surface faces the modulator crystal second surface and covers a portion of the modulator crystal second surface such that the active area of the first surface of the modulator crystal has a homogeneous temperature;
   (c) providing one or more electronic components residing above the first surface of the modulator crystal, wherein the electronic components are thermally insulated from the modulator crystal and from the heating element;
   (d) heating the modulator crystal with the heating element to a temperature within a predetermined temperature range; and
   (e) maintaining the temperature of the modulator crystal within the predetermined temperature range.

23. An imaging assembly comprising:
   (a) a modulator crystal comprising a first surface and a second surface substantially opposite to the first surface, wherein the first surface comprises an active area;
   (b) a heating element for heating the modulator crystal to a temperature within a predetermined temperature range, wherein the heating element contacts and covers a portion of the modulator crystal second surface such that the active area of the first surface of the modulator crystal has a homogeneous temperature; and
   (c) one or more electronic components positioned under the first surface of the modulator crystal, wherein the electronic components are thermally insulated from the modulator crystal and from the heating element.

24. The imaging assembly of claim 23, wherein the heating element is a nickel-chromium coating.

25. The imaging assembly of claim 23, wherein the one or more electronic components are thermally insulated from the modulator crystal and from the heating element by one or more thermally insulating elements contacting the one or more electronic components and contacting the second surface of the modulator crystal.

26. The imaging assembly of claim 23, further comprising a cooling support positioned under the one or more electronic components and thermally connected to the one or more electronic components.

27. The imaging assembly of claim 26, wherein the cooling support is thermally connected to the one or more electronic components by one or more thermally conductive elements contacting the cooling support and contacting the one or more electronic components.

28. The imaging assembly of claim 23, wherein the heating element is connected to means for providing power from a power source to the heating element, and the power source comprises a temperature control means for maintaining the modulator crystal temperature within the predetermined temperature range.

29. The imaging assembly of claim 23, wherein the heating element first surface substantially covers the modulator crystal second surface.

30. A method for heating a modulator crystal in an imaging assembly, the method comprising:
   (a) providing a modulator crystal comprising a first surface and a second surface substantially opposite to the first surface, wherein the first surface comprises an active area;
   (b) contacting and covering with a heating element a portion of the modulator crystal second surface such that the active area of the first surface has a homogeneous temperature;
   (c) providing one or more electronic components positioned under the first surface of the modulator crystal, wherein the electronic components are thermally insulated from the modulator crystal and from the heating element;
   (d) heating the modulator crystal with the heating element to a temperature within a predetermined temperature range; and
   (e) maintaining the temperature of the modulator crystal within the predetermined temperature range.

* * * * *